Figure 4:
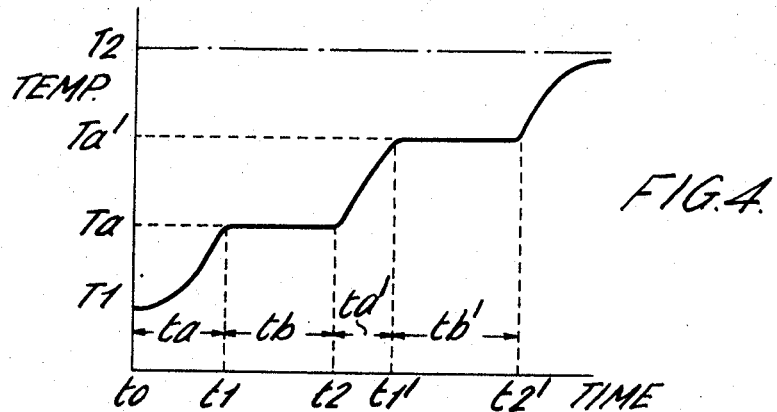

United States Patent
Tatsutomi et al.

[11] 3,756,083
[45] Sept. 4, 1973

[54] THERMALLY OPERATED ACTUATOR DEVICE

[75] Inventors: Yasuo Tatsutomi, Tokuichi Matsumoto; Akikazu Sawada, all of Hiroshima, all of Japan

[73] Assignee: Toyo Kogyo, Ltd., Hiroshima-ken, Japan

[22] Filed: Jan. 11, 1971

[21] Appl. No.: 105,320

[30] Foreign Application Priority Data
Jan. 12, 1970 Japan.................................. 45/3658
Jan. 12, 1970 Japan.................................. 45/3659
Jan. 14, 1970 Japan.................................. 45/4016

[52] U.S. Cl.................. 73/368.3, 60/23, 236/101, 251/11, 337/332
[51] Int. Cl. ... F03g 7/06, G05d 23/02, H01h 37/32
[58] Field of Search........................... 73/358, 368.3; 236/101; 337/332; 60/23; 251/11

[56] References Cited
UNITED STATES PATENTS

| | | | |
|---|---|---|---|
| 1,994,757 | 3/1935 | DeFlorez et al. | 73/342 X |
| 3,027,730 | 4/1962 | Bauerlein | 73/368.3 X |
| 3,464,047 | 8/1969 | Heron | 337/332 |
| 2,705,270 | 3/1955 | Moran | 337/326 |
| 3,204,461 | 9/1965 | Szekely | 73/358 |
| 3,149,455 | 9/1964 | Daly et al. | 73/368.3 X |
| 3,182,910 | 5/1965 | Karppinen et al. | 73/368.3 X |
| 3,386,065 | 5/1968 | Algino | 251/11 X |

*Primary Examiner*—Richard C. Queisser
*Assistant Examiner*—Frederick Shoon
*Attorney*—Craig, Antonelli & Hill

[57] ABSTRACT

A thermally operated actuator device which is capable of operating an external instrument operatively connected with said actuator device in response to changes in temperature of a medium to which said actuator device is fitted or immersed, in a delayed manner with respect to the time at which such changes in temperature has actually been taken place.

21 Claims, 7 Drawing Figures

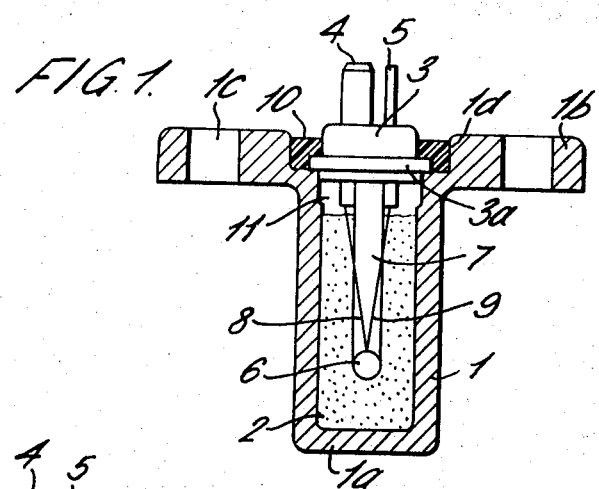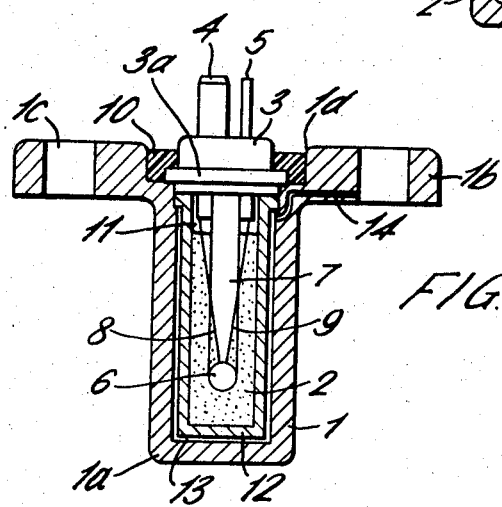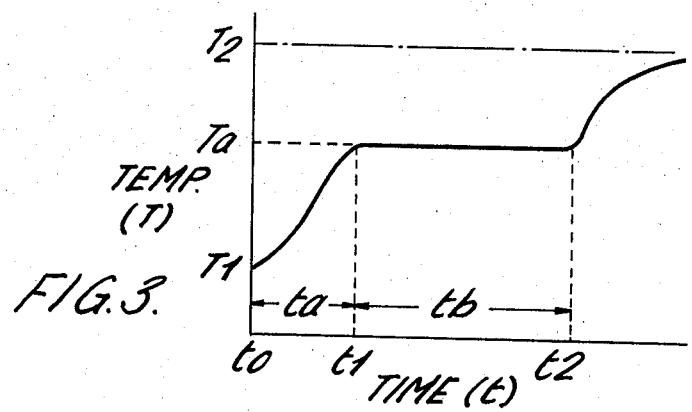

Patented Sept. 4, 1973  3,756,083

2 Sheets-Sheet 2

INVENTORS
YASUO TATSUTOMI, TOKUICHI MATSUMOTO & AKIKAZU SAWADA
BY Craig, Antonelli, Stewart & Hill
ATTORNEYS

THERMALLY OPERATED ACTUATOR DEVICE

The present invention relates to a thermally operated actuator device and, more particularly, to a device capable of operating an electric or mechanical instrument in response to changes in temperature of a surrounding medium after a predetermined time has elapsed since such changes in temperature of the medium actually take place.

It is first to be noted that the device of the present invention which will be hereinafter fully disclosed in conjunction with preferred embodiments has a nature similar to an electric timing device adapted to operate an external device connected with such timing device after a lapse of predetermined time. In other words, the device of the present invention is such that, although the device of the present invention responds to changes in temperature of a surrounding medium, an electric or mechanical switch or any external instrument operatively connected therewith can be activated after a lapse of predetermmined time from the time such changes in temperature of the medium have actually taken place.

A thermally operated actuator device of the type heretofore available generally comprises a temperature sensitive element capable of generating an electric or mechanical output in response to changes in temperature of a surrounding medium. In general, a thermistor, a thermocouple or a thermostat is employed for the temperature sensitive element capable of generating an electric output, whereas means including a pellet capable of considerably expanding under the influence of heat so as to operate a plunger or piston is employed for the temperature sensitive element capable of generating a mechanical output.

In either case, according to the conventional thermally operated actuator device, the temperature sensitive element is usually in contact with a surrounding medium, fluid or solid, of which the temperature is to be detected and will therefore generate the output in response to changes in temperature of the medium thereby to readily activate an external instrument at the time or shortly after such changes in temperature are detected.

However, since industrial technology has been considerably developed, a thermally operated actuator device capable of being operated in response to changes in temperature of a surrounding medium after a lapse of time has been necessitated. For example, in the automobile industry, such thermally operated actuator device is necessitated in order to reduce the amount of unburned compounds present in exhaust gas emerging from the exhaust system of an automotive vehicle especially when the engine is initially driven.

By way of example, it is well known that exhaust gas which emerges from the exhaust system of an automotive vehicle when the engine is initially driven contains a relatively large amount of unburned compounds. In order to reduce the amount of the unburned compounds emerging at this time, an effort has been made to delay the ignition timing thereby to continue the combustion of fuel in the exhaust-manifold. In this case, the delay of the ignition timing is preferably maintained until the engine is heated to a predetermined temperature and the engine is driven for a predetermined time under the heated condition.

This suggestion to delay the ignition timing results from the fact that the combustion rate of fuel employed in an automotive vehicle can be improved as the engine is heated enough to vaporize the fuel within an engine combustion chamber.

To this end, if a conventional thermally operated actuator device is employed in the ignition system of an automotive vehicle to operate in response to changes in temperature of a liquid medium employed for cooling the engine, the ignition timing system will be returned from the delayed ignition timing back to the ordinary ignition timing prior to the time at which the temperature of the combustion chamber reaches an optimum value because the liquid cooling medium is rapidly heated to a predetermined maximum temperature in a short time. In such case, the desired object to reduce the amount of the unburned compounds present in the exhaust gas cannot be sufficiently achieved.

Accordingly, one object of the present invention is to provide a thermally operated actuator device capable of operating an external instrument in response to changes in temperature of an medium of which the temperature is to be detected, after a laspe of predetermined time after such changes actually take place.

Another object of the present invention is to provide a thermally operated actuator device comprising thermal conductive material sandwiched between means for sensing changes in temperature of a surrounding medium present outside the thermally operated actuator device and means for responding to the changes in temperature of the medium transmitted through said thermally conductive material whereby the operation of the thermally operated actuator device can be delayed for a predetermined time.

A further object of the present invention is to provide a thermally operated actuator device of the above type wherein the means for responding to the changes in temperature of the thermally conductive material includes an electrical or mechanical element for generating an electrical or mechanical output which may be utilized to operate an external instrument.

Figure 5:
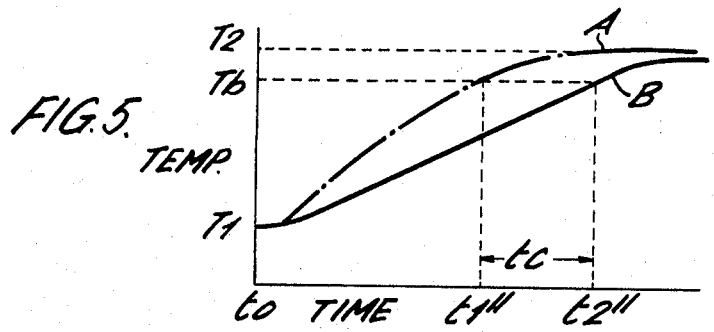
Figure 6:
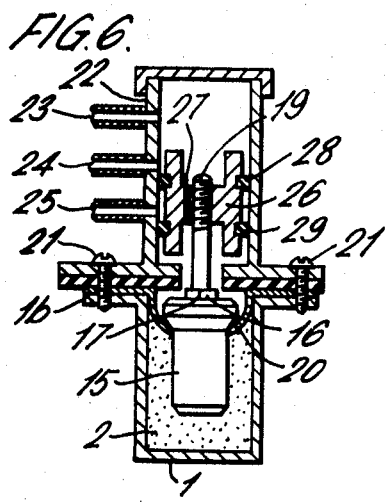
Figure 7:
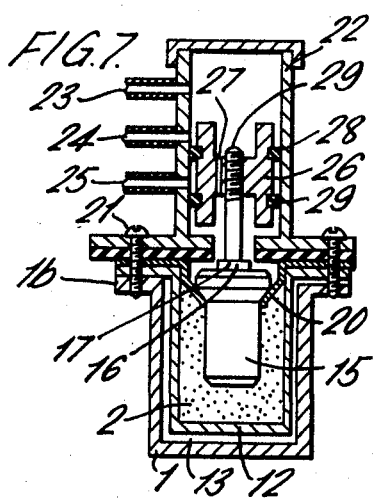

These and other objects and features of the present invention will become apparent to those skilled in the art from the following description taken in conjunction with some preferred embodiments of the present invention shown in the accompanying drawings only for the purpose of illustration thereof, in which;

FIG. 1 is a sectional view of a thermally operated actuator device of the present invention in one preferred embodiment, FIG. 2 is a sectional view of the thermally operated actuator device of the present invention in another preferred embodiment, FIG. 3 is a curve showing changes in temperature of a thermally conductive material employed in the thermally operated actuator device of the present invention in the case where the thermally conductive material consists of a single substance having one melting point, FIG. 4 is a curve showing changes in temperature of the thermally conductive material in the case where the thermally conductive material consists of a mixture of two substances having different melting points, FIG. 5 is a curve showing changes in temperature of the thermally conductive material in the case where the thermally conductive material consists of a substance having a specific heat higher than that of a medium of which change of temperature is to be detected for the purpose of operating the thermally operated actuator device of the present invention, FIG. 6 is a sectional view of the thermally operated actuator device according to the teachings of the present invention incorporating a valving structure, and FIG. 7 is a similar view to FIG. 6, but showing a modified form of the device incorporating a valving structure.

Before the description proceeds, it is to be noted that like parts are designated by like reference numerals throughout the accompanying drawings.

Referring now to FIG. 1, the thermally operated actuator device of the present invention generally comprises a casing 1 of preferably cylindrical shape having a bottom 1a and a radially outwardly extending flange 1b. This casing 1 is preferably made of low heat conductive material, preferably a chemically and thermally stabilized synthetic resin such as phenol resin, and may be integrally formed by a known plastic molding technique. In the embodiment as shown, the flange 1b of the casing 1 is formed with a pair of through holes 1c adapted to receive fastening members (not shown) therethrough for the purpose of mounting the assembled device to a rigid body to which it is to be fitted in such a manner as will be mentioned later. This flange 1b is also formed on its upper surface with a recess 1d of a diameter slightly larger than the inner diameter of the cylindrical casing 1. This casing 1 is filled with a suitable amount of thermally conductive material 2 as will be mentioned later.

The recess 1d formed in the flange 1b of the casing 1 is adapted to receive a collar portion 3a of a carrier member 3 made of heat insulating material such as phenol resin. This carrier member 3 is provided with a pair of electroconductive terminal members 4 and 5 extending therethrough. Embedded in the thermally conductive material 2 within the casing 1 and preferably spaced equally from the interior surface of the bottom 1a and that of the casing 1 is a temperature sensitive element 6 rigidly supported by the adjacent end of a supporting rod 7, the other end of said supporting rod 7 being rigidly or integrally connected with the carrier member 3. The supporting rod 7 may be made of the same material as employed for the carrier member 3 and the longitudinal axis thereof is preferably aligned with that of the casing 1.

The temperature sensitive element 6 is an instrument capable of responding to changes in temperature and activating an electric or mechanical switch incorporated therein or disposed outside the instrument and may be in the form of a thermostat, a thermocouple, or a thermistor. However, in the case where the thermocouple, thermistor or temperature resistor is employed for the temperature sensitive element an accessory circuit is necessary for converting the measured value of temperature into an electrical signal directly adapted to activate the electrical or mechanical switch.

Extending between the electroconductive terminal members 4 and 5 and the temperature sensitive element 6 is a pair of lead-in wires 8 and 9, both sheathed with heat insulating material and adapted to connect between the electroconductive terminal members 4 and 5 and the temperature sensitive element 6, respectively. These terminal members 4 and 5 are in turn electrically connected with a switch, relay, or any other external instruments to be operated by the thermally operated actuator device of the present invention. However, it is to be noted that the lead-in wires 8 and 9 may be embedded in the supporting rod 7 in an electrically insulated manner.

The carrier member 3 is preferably engaged in the recess 1d in a non-detachable manner by the use of an adhesive filler material 10, for example, Araldite (Registered Trademark owned by Ciba Limited).

The volume of the casing 1 occupied by the thermally conductive material 2 is preferably smaller than the total volume of said casing 1 so as to permit the expansion of the thermally conductive material 2 which will take place as the latter is heated. A spacing 11 within the casing 1 defined by the difference between the both abovementioned volumes is provided for this purpose.

In FIG. 2, a modification of the device shown in FIG. 1 is shown wherein the casing 1 is made of metal plate and the thermally conductive material 2 is contained in a container 12 of which the outer diameter is smaller than the inner diameter of the casing 1. This container 12 is tightly sealed by the undersurface of the carrier member 3 with the conductive material 2 and the spacing 11 therein, and the container 12 is accommodated in the casing 1 so that a gaseous layer 13 can be formed therebetween. The gaseous layer 13 is, in the embodiment shown in FIG. 2, communicated with the atmosphere by means of a vent passage 14 formed in the flange 1b of the casing so that a relatively longer time delay can be obtained until heat is transmitted from the outside of the casing 1 to the temperature sensitive element 6. However, the vent passage 14 is not always necessary and, therefore, the gaseous layer 13 may be sealed.

In either of these embodiments shown in FIGS. 1 and 2, the thermally operated actuator device of the present invention constructed as hereinbefore described can be mounted in such a manner that, if the surrounding medium of which the temperature is to be detected is fluid, a lower portion of the casing 1 is immersed in the fluid medium and, if the surrounding medium is solid, the lower portion thereof is contacted with the solid medium.

The thermally conductive material 2 is adapted to transmit the heat generated outside the casing 1, i.e., the temperature of the surrounding medium, to the temperature sensitive element 6 in a delayed manner. To this end, any solid material having a melting point not more than the temperature achieved by the surrounding medium or any liquid compound having a high specific heat near to or preferably, higher than that of the medium, can be employed for the thermally conductive material 2. In addition, a mixture of two or more solid substances having different melting points, the value of each of which being not more than the temperature achieved by the surrounding medium, can also be employed for the thermally conductive material 2. By way of example, since the cooling medium employed for cooling an automobile engine is usually heated up to 80° C. on an average during a period in which the engine is driven, one or a mixture of such solid substances as wax and paraffine having a melting point in the range of 50° C. to 70° C. or such liquid as carboxymethyl cellulose and polyvinyl alcohol having high specific heat near to that of the cooling medium may be employed for the thermally conductive material 2.

The manner in which the thermally conductive material 2 responds to changes in temperature of the surrounding medium will be hereinafter described with reference to FIG. 3, FIG. 4 and FIG. 5, each showing a curve of the response of the thermally conductive material 2 to the change of temperature wherein the abscissa represents time while the ordinate represents temperature of the thermally conductive material 2.

If a solid substance having a melting point of the value $T_a$ lower than the temperature $T_2$ achieved by the surrounding medium is employed for the thermally conductive material 2, heat transmission from the medium to the temperature sensitive element 6 will take place in a delayed manner until the temperature of the thermally conductive material 2 reaches a value substantially equal to the temperature $T_2$, as shown in FIG. 3. In other words, if the temperature of the medium is assumed to be rapidly increased to the value $T_2$ at the time $t_o$, changes in temperature of the thermally conductive material 2 will take place as shown by the curve of FIG. 3. More specifically, the temperature of the thermally conductive material 2 will increase in accordance with the lapse of time during a period $t_a$ defined from the time $t_o$ at which the normal temperature $T_1$ of the thermally conductive material 2 commences to increase to the time $t_1$ at which the thermally conductive material 2 achieves its melting point $T_a$. However, once the thermally conductive material 2 reaches to its melting point, no change of temperature of the thermally conductive material will take place until it can be completely melted at the time $t_2$, since the latent heat is absorbed by the remaining solid substance during a period $t_b$ defined from the time $t_1$ to the time $t_2$. Thereafter, the temperature of the thermally conductive material 2 thus completely melted will rapidly increase to the value equal to the temperature $T_2$ of the medium.

In this connection, if the temperature sensitive element 6 is adjusted to be operated immediately after the temperature of the thermally conductive material 2 starts to rapidly increase upon completion of melting, the operation of the thermally operated actuator device of the present invention can be delayed for a time which can be expressed by the sum of $t_a$ and $t_b$.

If the gaseous layer 13 is provided as shown in FIG. 2, the rate of increase of temperature of the thermally conductive material 2 can be lowered since the gaseous layer 13 acts as heat insulator, and therefore the value of the total time delay can be additionally increased.

FIG. 4 shows the curve of the response of the thermally conductive material 2 which is employed in the form of a mixture of solid substances having different melting points, for example, two different melting points $T_a$ and $T_a'$ each not more than the temperature $T_2$ achieved by the medium, to changes in temperature. In this case, similar consideration as given in connection with FIG. 3 can apply, but it is to be noted that a first half of the curve including the periods $t_a$ and $t_b$ is attributable to one of the substances having the melting point of the value $T_a$ while the remaining portion thereof is attributable to the other substances having the melting point of the value $T_a'$ higher than the melting point of the first mentioned substances.

FIG. 5 shows the curve of the response of the thermally conductive material 2 when employed in the form of a substance having a specific heat higher than that of the medium. It has been well known that a substance having a high specific heat in general has a low rate of heat conductivity and, therefore, the rate of increase of temperature of the thermally conductive material 2 is lower than that of the medium.

Referring now to FIG. 5, it is assumed that the temperature of the surrounding medium increases as indicated by a curve A from the value $T_1$ to the value $T_2$. Then, the temperature of the thermally conductive material 2 will increase as indicated by a curve B in response to changes in temperature of the medium. The difference between the curves A and B results from the difference between the specific heat of the medium and that of the thermally conductive material 2. If $T_b$ represents the working temperature at which the actuator device is to be operated, it will be understood that the time $t_2''$ at which the thermally conductive material 2 reaches the working temperature $T_b$ is delayed by the value $t_c$ relative to the time $t_1''$ at which the medium reaches to the working temperature $T_b$. Although the value of time delay can be expressed by the difference between the time $t_2''$ and the time $t_1''$, this time delay can be extended if the gaseous layer 13 as shown in FIG. 2 is provided.

However, it should be noted that the value of the time delay can be varied by adjusting the amount of the thermal conductive material 2, the amount of latent heat absorbed by the material 2 or the amount of specific heat of the material 2.

In the foregoing description, the latent heat absorbed by the thermally conductive material 2 upon its melting is utilized to delay the operation of the thermally operated actuator device of the present invention. However, the heat generated by the thermal conductive material 2 upon its solidification can be utilized for the same purpose. In this case, the actuator device should be set to operate immediately after the temperature of the thermally conductive material 2 begins to decrease upon completion of its solidification.

In order to obtain a longer time delay than that obtained by the device as hereinbefore described, a plurality of pairs of the thermally conductive material 2 and the gaseous layer 13 sandwiched together in an alternate manner within the casing 1 may be provided. If this provision will be made, heat transmission from the medium to the temperature sensitive element 6 can be more delayed than afforded by a single pair of the thermally conductive material and the gaseous layer. In this case, each gaseous layer is preferably communicated with the atmosphere so as to ensure a prevention of the eventual breakage of the device which may result from expansion of gaseous medium contained therein.

The thermally operated actuator device incorporating a valving structure according to the teachings of the present invention will be hereinafter described with reference to FIG. 6 and FIG. 7. However, it is to be noted that the difference between the device shown in FIG. 6 and that shown in FIG. 7 merely depends upon the provision of the gaseous layer 13 and the structure of a lower portion of the device may be the same as shown in FIG. 1 and FIG. 2 except that the carrier member 3 including the supporting rod 7 shown in FIG. 1 or FIG. 2 is substituted by a vessel 15 as shown in FIG. 6 or FIG. 7. Accordingly, for the purpose of simplification, the description will be hereinafter directed to the valving structure and the mounting of the vessel 15 within the casing 1 only with reference to FIG. 6.

The vessel 15 shown is in the form of a capsule and made of metal having a high heat conductivity. This vessel 15 is closed by a plug member 16 having a centrally disposed bore 17 through which a plunger or piston rod 19 is slidably extended.

The vessel 15 is suspended in the casing 1 by means of a holding member 20. A valve housing 22 formed with first, second and third ports 23, 24 and 25 is mounted on and secured to the upper surface of the flange 1b of the casing 1 by means of fastening members 21 which may be employed for fitting the device of the present invention to a rigid body to which it is mounted. The piston rod 19 has one end situated within the vessel 15 and the other end rigidly connected with a valve member 26 formed with a longitudinally extending passage 27. This valve member 26 is also provided on its peripheral surface with a pair of seal rings 28 and 29 each in tight contact with the inner peripheral surface of the valve housing 22. When the piston rod 19 is in an extended position, the ports 23 and 25 communicate with each other through the passage 27 formed in the valve member 26 while, when the piston rod 19 is in a retracted position, the ports 23 and 24 communicate with each other.

The extension and retraction of the piston rod 19 can be achieved by the expansion of pellet material contained in the vessel 15, which expansion will take place when the pellet material is heated.

Thus, it will be understood that the piston rod 19 can be operated in response to changes in temperature of the medium present outside the casing 1 after a lapse of predetermined time during which the temperature of the medium is transmitted to the pellet material in the vessel 15 through the thermally conductive material 2.

It is to be noted that both of the embodiments shown in FIG. 6 and FIG. 7 are directed to a thermally operated actuator device capable of generating the mechanical output through a plunger or piston rod which can be operated under the expansion of the pellet material contained in the vessel.

Although the present invention has been fully described by way of example for the sole purpose of illustration, it is to be noted that various modifications and changes are apparent to those skilled in the art. For example, the gaseous layer and the thermal conductive material between the inner surface of the casing and the temperature sensitive element may be reversed in position, although in the foregoing embodiments the gaseous layer is provided outside the thermal conductive material.

Accordingly, the present invention is not to be limited by the foregoing embodiments, but such modifications and changes are to be construed as included in the scope of the present invention.

What is claimed is:

1. A thermally operated actuator device comprising a casing to be in contact with a surrounding medium the temperature of which is to be detected, said casing being of substantially cylindrical shape having a peripheral portion and a bottom portion, a temperature sensitive element suspended within said casing so as to be equally spaced from the interior surface of said peripheral portion and said bottom portion of said casing and capable of generating an electrical output signal which may be utilized to operate an external instrument in response to detection of a predetermined temperature, and thermally conductive means including a material having a transition temperature at which said material changes physical states disposed in said casing surrounding said temperature sensitive element for transmitting the changes in temperature of said surrounding medium present outside said casing to said temperature sensitive element in a delayed manner with respect to the time at which said temperature changes actually take place during said change in physical state, said predetermined temperature being near but not equal to said transition temperature whereby said signal output from said element can be generated only when and after said temperature changes have been transmitted therethrough to said element.

2. A device according to claim 1, wherein said thermally conductive material has a melting point lower than the maximum temperature which may be attained by said surrounding medium.

3. A device according to claim 1, wherein said thermally conductive material has a solidification point higher than said predetermined temperature of said temperature sensitive element.

4. A device according to claim 1, wherein said thermally conductive material has a specific heat higher than that of the surrounding medium.

5. A device according to claim 1, wherein said thermally conductive material consists of a plurality of substances.

6. A device according to claim 1, wherein said casing is tightly sealed and is provided therein with a spacing for accommodating the expansion of the thermally conductive material under the influence of heat can be permitted.

7. A device according to claim 1, wherein said thermally conductive material has a melting point lower than said predetermined temperature of said temperature sensitive element.

8. A thermally operated actuator device as claimed in claim 1, wherein said casing is made of a low heat conductive material.

9. A thermally operated actuator device as claimed in claim 1, wherein said temperature sensitive element comprises a container suspended within said casing while being surrounded by said thermally conductive material, thermally expansible pellet material contained in said container, and a valving structure for generating a mechanical signal when said pellet material undergoes expansion upon receipt of the temperature transmitted thereto through the thermally conductive material and then said container, said mechanical signal being utilized to operate the external instrument.

10. A thermally operated actuator device comprising a casing to be in contact with a surrounding medium the temperature of which is to be detected, a temperature sensitive element suspended within said casing and capable of generating an output signal which may be utilized to operate an external instrument in response to changes in temperature of said surrounding medium, and a thermally conductive material disposed in said casing surrounding said temperature sensitive element, said material being capable of transmitting the changes in temperature of said surrounding medium present outside said casing in a delayed manner with respect to the time at which said temperature changes actually take place, whereby said power output from said element can be generated only when and after said temperature changes have been transmitted therethrough to said element, wherein said temperature sensitive element comprises an electrical switching element capable of generating an electrical signal only when the temperature sensed by said switching element exceeds a preset value, said electrical signal being utilized to operate the external instrument.

11. A thermally operated actuator device comprising a casing to be in contact with a surrounding medium the temperature of which is to be detected, a temperature sensitive element suspended within said casing and capable of generating an output signal which may be utilized to operate an external instrument in response to changes in temperature of said surrounding medium, a thermally conductive material disposed in said casing surrounding said temperature sensitive element, said material being capable of transmitting the changes in temperature of said surrounding medium present outside said casing in a delayed manner with respect to the time at which said temperature changes actually take place, and a plurality of gaseous layers disposed between said casing and said temperature sensitive element for additionally delaying the transmission of the temperature changes of said surrounding medium in cooperation with said thermally conductive material, whereby said output signal from said element can be generated only when and after said temperature changes have been transmitted to said element through said material and said gaseous layer.

12. A device according to claim 11, wherein said gaseous layer is in communication with the atmosphere.

13. A device according to claim 11, wherein said thermally conductive material is disposed within the casing without contacting said temperature sensitive means while the gaseous layer is positioned therebetween.

14. A thermally operated actuator device comprising a casing to be in contact with a surrounding medium the temperature of which is to be detected, a temperature sensitive element suspended within said casing and capable of generating an output signal which may be utilized to operate an external instrument in response to changes in temperature of said surrounding medium, a thermally conductive material disposed in said casing surrounding said temperature sensitive element, said material being capable of transmitting the changes in temperature of said surrounding medium present outside said casing in a delayed manner with respect to the time at which said temperature changes actually take place, and at least one gaseous layer disposed between said casing and said temperature sensitive element for additionally delaying the transmission of the temperature changes of said surrounding medium in cooperation with said thermally conductive material, whereby said output signal from said element can be generated only when and after said temperature changes have been transmitted to said element through said material and said gaseous layer, wherein a container is accommodated within said casing, said thermally conductive material and said temperature sensitive element being arranged within said container, and said gaseous layer is disposed between said casing and said container.

15. A thermally operated actuator device capable of indicating prescribed temperature levels in a delayed manner, comprising a thermally conductive material having a transition temperature at which said material changes physical states, and temperature sensing means immersed in said material for producing an indication in response to detection of a predetermined temperature near said transition temperature but not equal thereto, so that a change in temperature of said thermally conductive material to said predetermined temperature through said transition temperature will produce actuation of said temperature sensing means with a delay equal to the transition time of the material.

16. A thermally operated actuator device as defined in claim 15, wherein said temperature sensing means comprises an electrical switching element capable of generating an electrical signal only when the temperature of said material equals said predetermined temperature.

17. A thermally operated actuator device as defined in claim 15, wherein said thermally conductive material is disposed within a casing and said temperature sensing means comprises a temperature sensitive element which is sensitive to said predetermined temperature.

18. A thermally operated actuator device as claimed in claim 17, wherein said temperature sensitive element comprises a container suspended within said casing while being surrounded by said thermally conductive material, thermally expansible pellet material contained in said container, and a valving structure for generating a mechanical signal when said pellet material undergoes expansion upon receipt of the temperature transmitted thereto through the thermally conductive material and then said container.

19. A thermally operated actuator device as defined in claim 17, wherein said thermally conductive material is spaced from said casing so as to provide a gaseous layer therebetween for additionally delaying the transmission of temperature changes to said temperature sensitive element in cooperation with said thermally conductive material.

20. A device according to claim 19, wherein a container is accommodated within said casing, said thermally conductive material and said temperature sensitive element being arranged within said container, and said gaseous layer is disposed between said casing and said container.

21. A device according to claim 19, wherein said gaseous layer is in communication with the atmosphere.

* * * * *